US009489727B2

(12) United States Patent
Lu et al.

(10) Patent No.: US 9,489,727 B2
(45) Date of Patent: Nov. 8, 2016

(54) METHOD FOR GENERATING A PREFERRED IMAGE BY REPLACING A REGION OF A BASE IMAGE

(71) Applicant: MULTIMEDIA IMAGE SOLUTION LIMITED, Dublin 2 (IE)

(72) Inventors: YanQing Lu, Hangzhou (CN); Jin Wang, Hangzhou (CN)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 0 days.

(21) Appl. No.: 14/609,433

(22) Filed: Jan. 30, 2015

(65) Prior Publication Data

US 2016/0225127 A1 Aug. 4, 2016

(51) Int. Cl.
| | | |
|---|---|---|
| *G06K 9/20* | (2006.01) | |
| *G06T 5/50* | (2006.01) | |
| *G06T 3/00* | (2006.01) | |
| *G06K 9/00* | (2006.01) | |
| *G06K 9/62* | (2006.01) | |

(52) U.S. Cl.
CPC .............. *G06T 5/50* (2013.01); *G06K 9/00268* (2013.01); *G06K 9/6202* (2013.01); *G06T 3/00* (2013.01); *G06T 2207/20141* (2013.01); *G06T 2207/30201* (2013.01)

(58) Field of Classification Search
USPC ........ 382/282, 284, 118, 293; 345/421, 629; 348/241
See application file for complete search history.

(56) References Cited

U.S. PATENT DOCUMENTS

| | | | |
|---|---|---|---|
| 7,362,918 B2* | 4/2008 | Herley | ...................... G06T 5/50 345/421 |
| 8,515,137 B2* | 8/2013 | Richards | ................. G06T 5/005 382/118 |
| 8,594,460 B2 | 11/2013 | Lindskog | |
| 8,837,859 B2* | 9/2014 | Richards | ................. G06T 5/005 382/118 |

* cited by examiner

*Primary Examiner* — Anh Do
(74) *Attorney, Agent, or Firm* — Winston Hsu; Scott Margo (57) ABSTRACT

To generate a preferred image, at least two images may be captured. From the at least two images, a base image is selected to be edited and another image is selected as a source of image data used for editing the base image. A user selects an object of the base image to be replaced. The object on the base image is compared to the object on the another image to generate a region on the base image and the another image. The region on the base image is replaced with the region on the another image.

19 Claims, 8 Drawing Sheets

METHOD FOR GENERATING A PREFERRED IMAGE BY REPLACING A REGION OF A BASE IMAGE

BACKGROUND OF THE INVENTION

1. Field of the Invention

The present invention relates to a method for generating a preferred image, and more particularly, a method for generating a preferred image by replacing a region of a base image.

2. Description of the Prior Art

There is a growing interest to capture a moment in life by taking a picture as a remembrance. Though present mobile devices give the convenience of capturing images at any time and any place, there may be times in which there is not enough time to repeat taking of the same image until a preferred image of the user is captured. Thus, the user needs to use editing tools to generate a preferred image.

For prior art, if the user wants an object of an image to be replaced, the user is limited to selecting the same object from another image and replacing the object on the image. The prior art does not consider the matching of the background of the object during replacement and is not able to automatically replace the object. It would be obvious that the generated image has been edited by using data from the other image since the edges of the object replaced does not match with the background, perhaps due to movement of the subject or the camera during capture of a sequence of images. Therefore, there is a need to improve editing of images to get the best image possible.

SUMMARY OF THE INVENTION

An embodiment of the present invention presents a method for generating a preferred image. The method comprises capturing at least two images, selecting an image of the at least two images as a base image, selecting an object on the base image, identifying a region of the object on the base image and a region of the object on another image of the at least two images by comparing the object on the base image and the object on the another image, and replacing the region on the base image with the region on the another image.

Another embodiment of the present invention presents a method for generating a preferred image. The method comprises sequentially capturing at least two images, selecting an object on a first image of the at least two images, identifying a region on the first image where the region on the first image includes the object on the first image and an area around the object on the first image, identifying a region on a second image of the at least two images where the region on the second image includes the object on the second image and an area around the object on the second image, adjusting sizes of the region on the first image and the region on the second image until differences in image data between the area around the object on the first image and the area around the object on the second image are below a predetermined threshold, and replacing the region on the second image with the region on the first image.

A further embodiment of the present invention presents a method for generating a preferred image. The method comprises sequentially capturing at least two images, selecting an object on a first image of the at least two images, identifying a region on the first image where the region of the first image includes the object on the first image and an area around the object on the first image, identifying a region on a second image of the at least two images where the region of the second image includes the object on the second image and an area around the object on the second image, adjusting sizes of the region on the first image and the region on the second image until differences in image data between the area around the object on the first image and the area around the object on the second image are below a predetermined threshold, and replacing the region on the first image with the region on the second image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
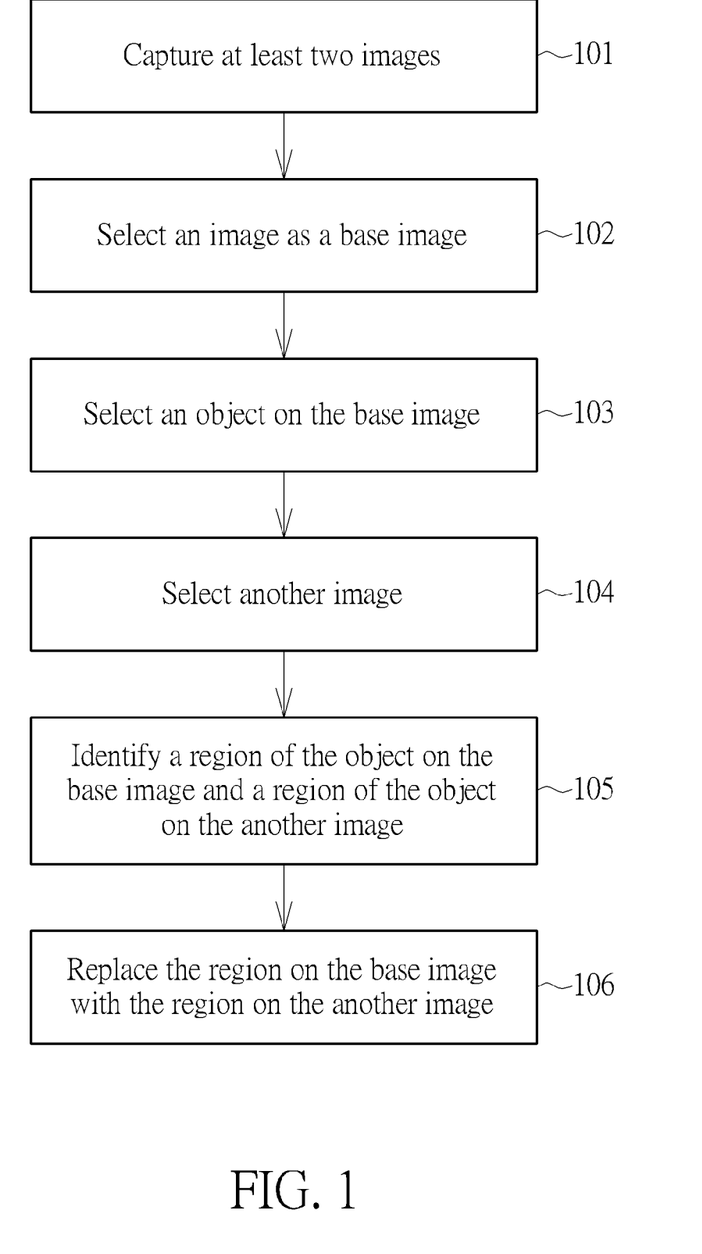
FIG. 1 illustrates a flowchart of a method for generating a preferred image according to an embodiment of the present invention.

FIG. 1 illustrates a flowchart of a method for generating a preferred image according to an embodiment of the present invention. The steps of the method for generating a preferred image may include but is not limited to the following steps:

Step 101: capture at least two images;

Step 102: select an image of the at least two images as a base image;

Step 103: select an object on the base image;

Step 104: select another image of the at least two images as a source of image data used for editing the base image;

Step 105: identify a region of the object on the base image and a region of the object on the another image of the at least two images by comparing the object on the base image and the object on the another image; and Step 106: replace the region on the base image with the region on the another image.

In step 101, the at least two images may be captured using an image capturing device such a camera or a video recorder. The at least two images may be images captured sequentially by the image capturing device and may have similar background. The file type of the at least two images may be the same since the at least two images may be captured by the same image capturing devices. But the at least two images may also be different as long as the pixels of the at least two images are comparable to each other. The resolution of the at least two images may be the same or different from each other. Subjects of the plurality of image may also be all the same. And the position of the subjects in all of the at least two images may be the same. Note that the at least two images are not limited to having only two images. The at least two images may correspond to any number of images having characteristics needed by the method for replacing a region of an image of the at least two images with a region of another image of the at least two images.

After the at least two images are captured, features of the at least two images may be matched to one another to determine the possibility of interchanging any of the regions of the at least two images captured. The at least two images may be matched according to the subjects and the setting. The at least two images may be checked if all of the at least two images have the same number of subjects, if the subjects are the same, id the background is the same, and if the foreground is the same. If one or more images of the at least two images does not match with the other images of the at least two images, the one or more images may be removed from the at least two images and prevented from being used during further processing.

In step 102, one image of the at least two images may be selected to be a base image. The base image may be the image to be edited to generate the preferred image. In some embodiments, the base image may be a first image of sequentially captured at least two images.

In step 103, the object may be selected from the base image. The object may be a face of a subject of the at least two images. The object may be selected by selecting a point of the object or by defining the edge of the object.

To further simplify the identification of the region of the object, an area of comparison on the base image may be determined according to the object such as a face. The area of comparison may be a portion of the base image having an area N times larger than the area of the face and having a same center as the face. But, the area of comparison may not include unnecessary data such as data from another object such as another face in the base image. The area of comparison may be used to limit the area to be processed during the identification of the region of the object. In doing so, the area to be processed for identifying the region of the object is reduced. Thus, the process for generating a preferred image is further simplified.

In step 104, the another image of the at least two images may be selected as a source of image data used for editing the base image. If the object is a face, a user interface may be used for previewing and selecting the face of the subject from images of the at least two images other than the base image.

To further simplify the identification of the region of the object, an area of comparison on the another image may be determined according to the object such as a face. The area of comparison may be a portion of the another image having an area N times larger than the area of the face and having a same center as the face. But, the area of comparison may not include unnecessary data such as data from another object in the another image. The area of comparison may be used to limit the area to be processed during the identification of the region of the object. In doing so, the area to be processed for identifying the region of the object is reduced. Thus, the process for generating a preferred image is further simplified.

In step 105, the region of the object on the base image and the region of the object on the another image of the at least two images may be identified, wherein the object may be a face. The region on the base image and the region on the another image may be determined by comparing the face on the base image and the face on the another image. The region of the face on the base image may be larger than the area of the face on the base image and may include the face on the base image and an area around the face on the base image. To identify the region of the face on the base image and the region of the face on the another image of the at least two images, the area around the face on the base image may be compared with the area around the face on the another image to find similarity around the face on the base image and the face on the another image. The region of the face on the base image and the region of the face on the another image may be automatically identified and may be of the same size. To identify the area of the region of the face on the base image and the region of the face on the another image, the outline of the region may be identified by matching data around the face on the base image and the face on the another image. The outline of the region may also be automatically selected. The area of comparison on the base image may be in the same position with the area of comparison on the another image. But, the area of comparison of the base image may or may not be the same area as the area of comparison of the another image.

During the identification of the region, the at least two images may be represented as $I_1$ to $I_n$. Where n is the number of images of the at least two images. A radiance map may be generated for each of the at least two images $I_1$ to $I_n$ using equation (1).

$$R_i(x) = e^{-\lambda d(x, F_i)} \quad (1)$$

wherein i is the order of the image in the sequence of the at least two images, x is a position of a pixel on an image, $F_i$ is an object in the image $I_i$ which may be a face having all edges set as 0, $d(x, F_i)$ is the shortest path between x and $F_i$, and $\lambda$ is a constant number.

From the radiance map, an image index L may be generated using equation (2).

$$L(x) = \arg\max R_i(x) \quad (2)$$

From the image index L, a region may be generated using equation (3).

$$M_i(x) = 1 \text{ if } L(x) = 1$$

$$0 \text{ otherwise} \quad (3)$$

wherein, pixels x having a corresponding $M_i(x)$ equal to 1 comprise the outline of the region.

Further processing may be done on the region to prevent any imperfections occurring during replacement of the region on the base image. The region may be dilated using equation (4).

$$MD_i = \text{dilate}(M_i, r) \quad (4).$$

where r is a predetermined dilation constant.

In step 106, the region on the base image may be replaced with the region on the another image. To perform replacement of the region on the base image with the region on the another image, a Laplacian pyramid may be used. A Laplacian pyramid may be generated for the base image and the region of the another image. A Gaussian pyramid for a mask image may be generated. The above mentioned pyramids may then be combined to generate a plurality of Laplacian layers. Each of the plurality of Laplacian layers may be stacked together to form the preferred image.

The above mentioned method may be repeated until all the object such as a face in the base image the user selects is edited to be replaced with a preferred image data from another image.

Figure 2A:
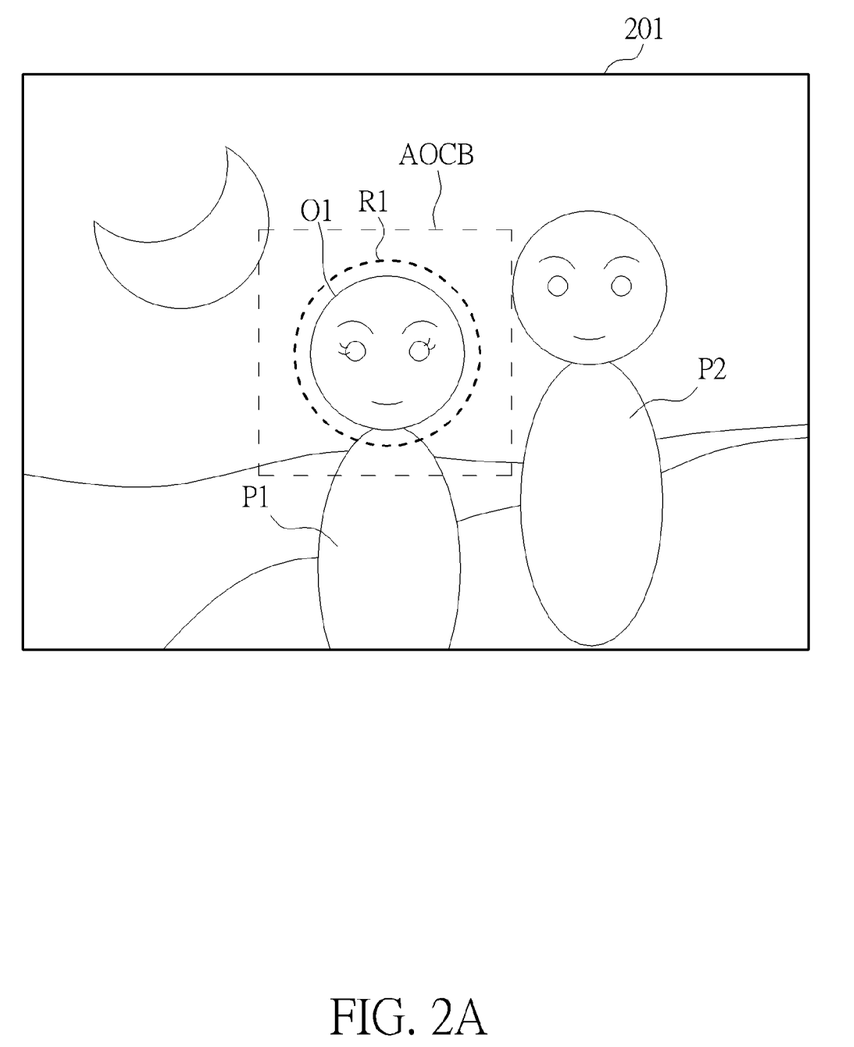
FIGS. 2A-2D illustrate the at least two images used to generate a preferred image according an embodiment of the present invention.
Figure 2B:
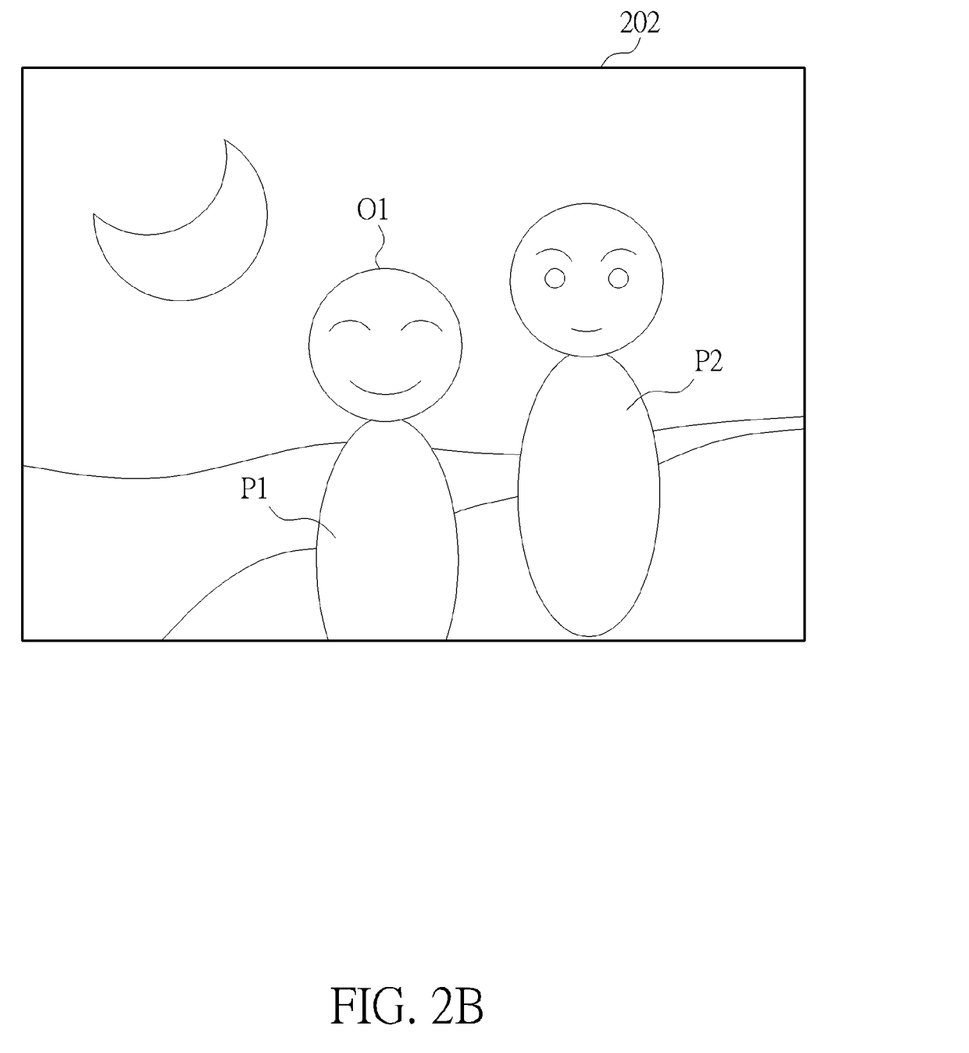
Figure 2C:
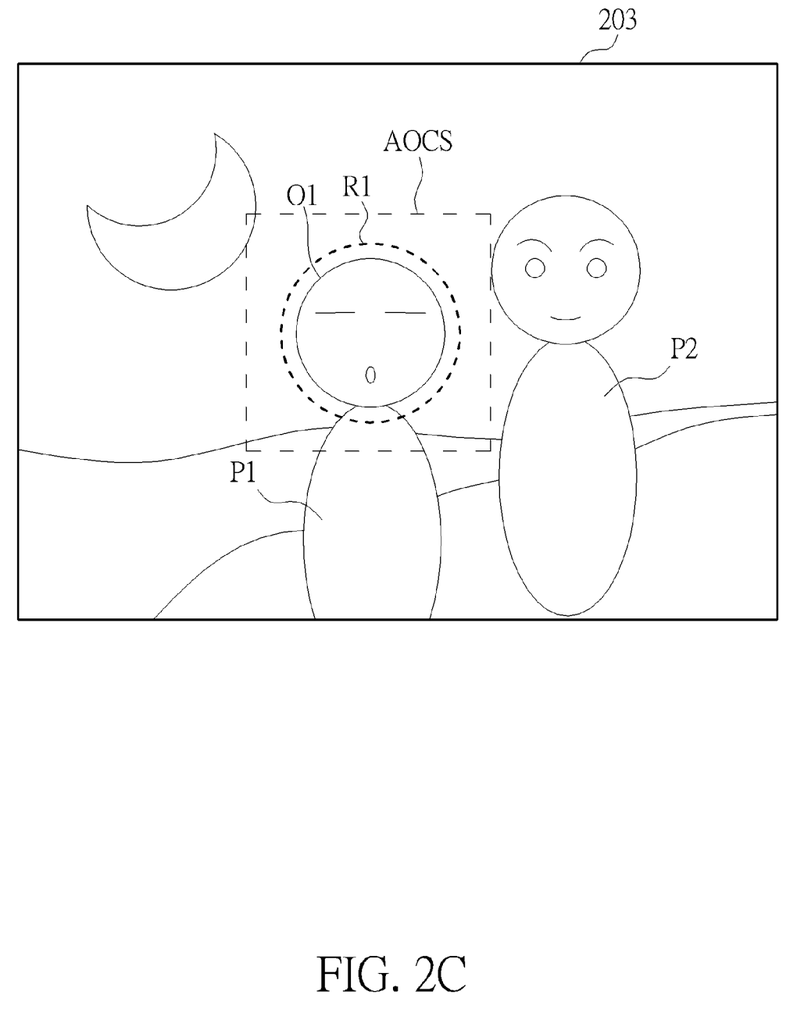
Figure 2D:
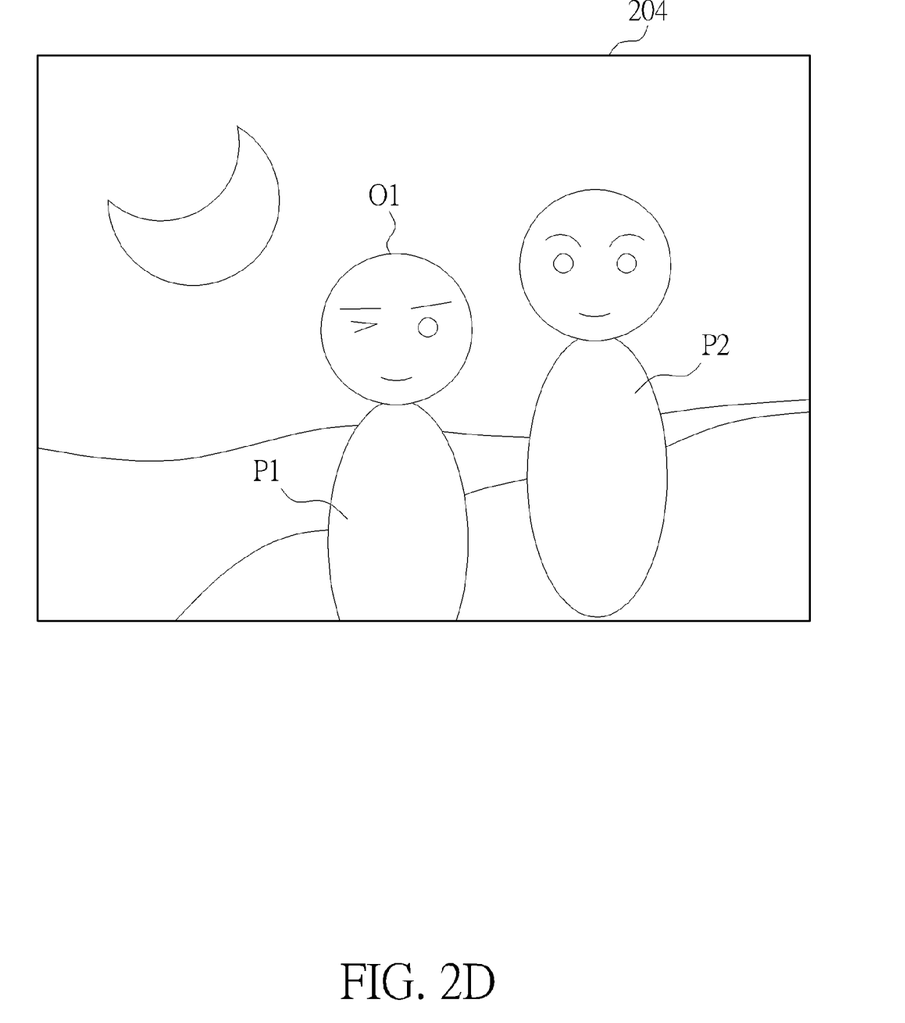
Figure 3:
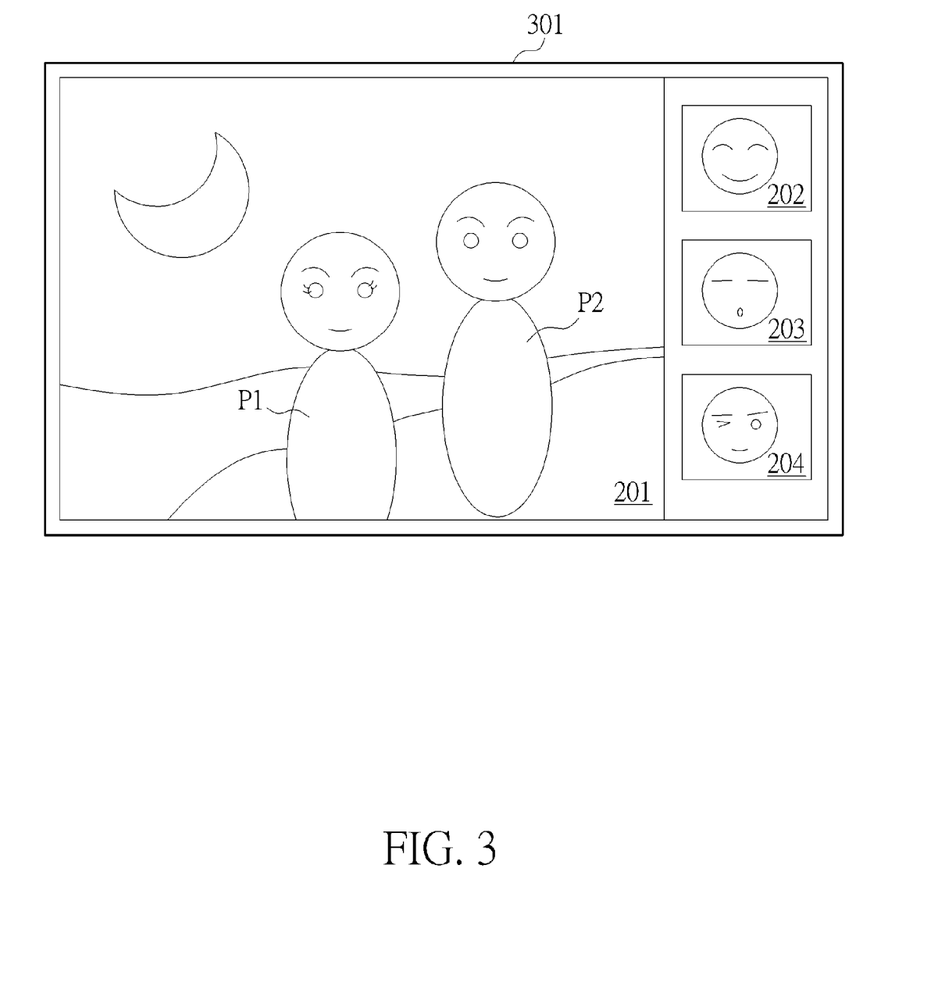
FIG. 3 illustrates a user interface used to display preview of the object on the images according to an embodiment of the present invention.

For example, at least two images may comprise of four sequentially captured images. FIGS. 2A-2D illustrate the at least two images 201-204 used to generate a preferred image according to an embodiment of the present invention. The images in FIGS. 1A-1D may all have the same subjects and may all have the same background. For this example, there may be two subjects P1 and P2 captured in the at least two images 201-204. After the at least two images 201-201 have been captured, a processor may be used to process the at least two images 201-204. The image in FIG. 2A may be the first image 201 on the sequentially captured plurality of images 201-204 and may be selected as the base image. From the base image, a user may select a face O1 of a subject P1 having an expression not preferred by the user (i.e. the subject may have blinked, not smiling, or not facing the image capturing device when the image was captured) to be the object. From the images 202-204 of the at least two images 201-204, the face O1 may be detected and a preview of the face O1 on the images 202-204 may be displayed by the user interface for the user to select one of the images 202-204 as a source of image data used for editing the base image. FIG. 3 illustrates a user interface 301 used to display preview of the face O1 on the images 202-204 according to an embodiment of the present invention. For example, the user may select the image 203 to be the source of image data used for editing the base image.

After a source of image data used for editing the base image has been determined, the face O1 and the background of the face O1 on the base image and the face O1 and the background of the face O1 on the image 203 may be compared to each other. Based on the face O1 and the background of the face O1 on the base image and the image 203, a region R1 of the face O1 on the base image and the image 203 may be determined. The region R1 of the face O1 on the base image and the image 203 may be the same size. The outline of the region R1 may be determined upon the condition that the image data of the background surrounding the face O1 on the base image and the image data of the background surrounding the face O1 on the image 203 matched each other. The background surrounding the face O1 may correspond to any area surrounding the face O1 (i.e. the background surrounding the face O1 may be anything captured behind the subject P1 in the images 201-204 and/or parts of the subject P1 other than the face O1). The outline of the region R1 may consist of matching image data between the background of the face O1 on the base image and the image 203. The region R1 on the base image may be replaced with the region R1 on the image 203.

In another embodiment of the present invention, to further simplify the comparison of the face O1 in the base image and in the image 203, areas of comparison AOCB and AOCS may be respectively determined for both the base image and the image 203. The areas of comparison AOCB and AOCS may be of the same size or different size. When identifying the region R1 of the face O1 in the base image and the image 203, only the data within the areas of comparison AOCB and AOCS are compared.

Figure 4:
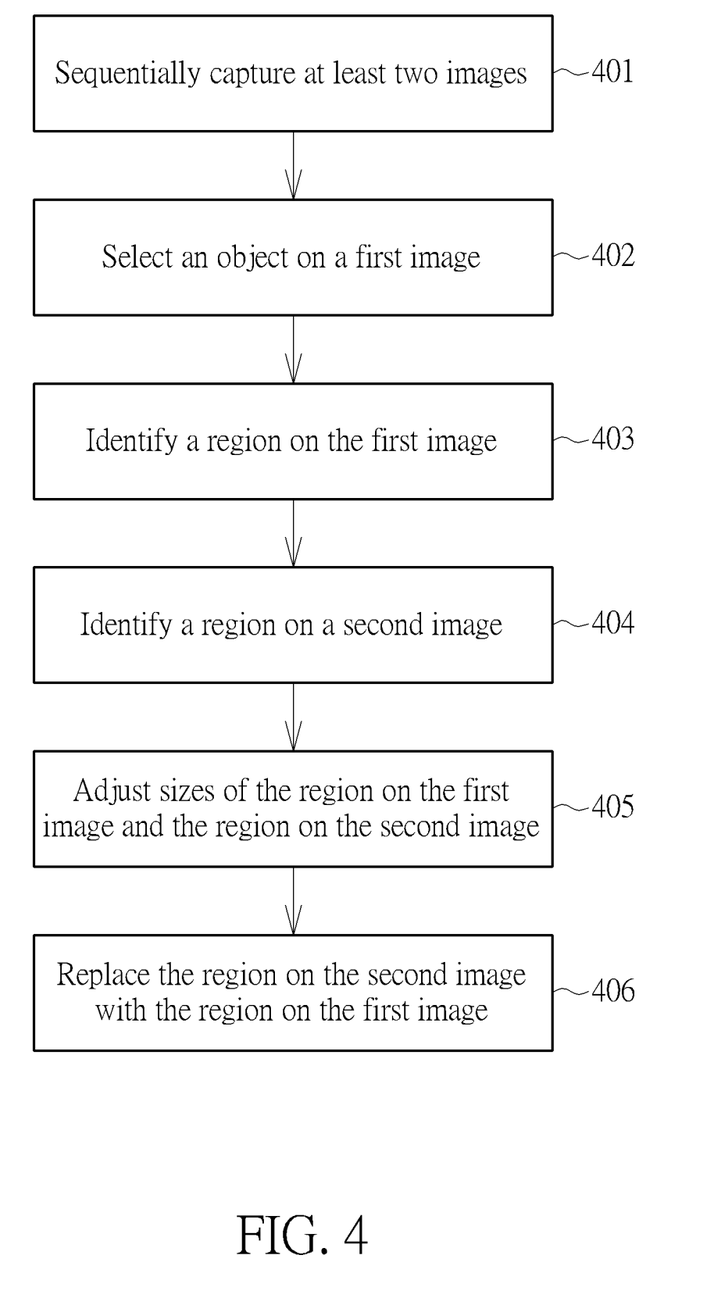
FIG. 4 illustrates a flowchart of a method for generating a preferred image according to another embodiment of the present invention.

FIG. 4 illustrates a flowchart of a method for generating a preferred image according to another embodiment of the present invention. The steps of the method for generating a preferred image may include but is not limited to the following steps:

Step 401: sequentially capture at least two images;

Step 402: select an object on a first image of the at least two images;

Step 403: identify a region on the first image where the region on the first image includes the object on the first image and an area around the object on the first image;

Step 404: identify a region on a second image of the at least two images where the region on the second image includes the object on the second image and an area around the object on the second image;

Step 405: adjust sizes of the region on the first image and the region on the second image until differences in image data between the area around the object on the first image and the area around the object on the second image are below a predetermined threshold; and Step 406: replace the region on the second image with the region on the first image.

When generating the preferred image, the region on the first image and the region the second image may be identified to have a same size. In some embodiments, adjustment of sizes of the region may include enlargement or shrinking of the region as long as the area around the object in the region remains greater than zero and preferably above a predefined threshold, such as, inter alia, 5% or 10% of the region. Also in some embodiments, the threshold may be determined by experimentation and/or texture and/or of the area around the object in the region. The object selected may correspond to a face of a subject of the plurality of sequentially captured images. And a user interface may be used for previewing and selecting the face of the subject from the at least two images corresponding to the object.

To further simplify the identification of the region of the object, an area of comparison on the first image and the second image may be determined according to the object such as a face. The area of comparison may be a portion of the first image and the second image having an area N times larger than the area of the face and having a same center as the face. But, the area of comparison may not include unnecessary data such as data from another object in the first image and the second image. The area of comparison may be used to limit the area to be processed during the identification of the region of the object. In doing so, the area to be processed for identifying the region of the object is reduced. Thus, the process for generating a preferred image is further simplified. The area of comparison on the first image may be in the same position with the area of comparison on the second image. But, the area of comparison of the first image may or may not be the same area as the area of comparison of the second image.

Figure 5:
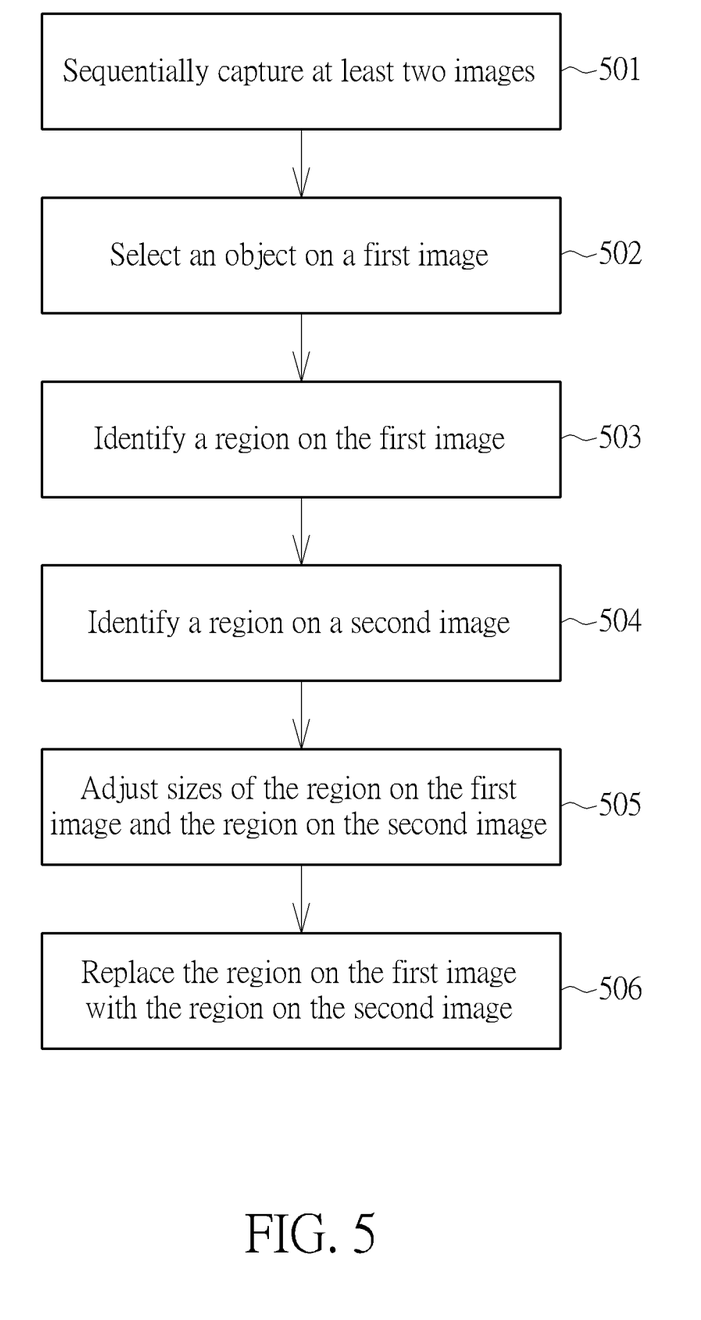
FIG. 5 illustrates a flowchart of a method for generating a preferred image according to a further embodiment of the present invention.

FIG. 5 illustrates a flowchart of a method for generating a preferred image according to a further embodiment of the present invention. The steps of the method for generating a preferred image may include but is not limited to the following steps:

Step 501: sequentially capture at least two images;

Step 502: select an object on a first image of the at least two images;

Step 503: identify a region on the first image where the region of the first image includes the object on the first image and an area around the object on the first image;

Step 504: identify a region on a second image of the at least two images where the region of the second image includes the object on the second image and an area around the object on the second image;

Step 505: adjust sizes of the region on the first image and the region on the second image until differences in image data between the area around the object on the first image and the area around the object on the second image are below a predetermined threshold; and Step 506: replace the region on the first image with the region on the second image.

When generating the preferred image, the region on the first image and the region the second image may be identified to have a same size. The object selected may correspond to a face of a subject of the plurality of sequentially captured images. And a user interface may be used for previewing and selecting the face of the subject from the at least two images corresponding to the object.

To further simplify the identification of the region of the object, an area of comparison on the first image and the second image may be determined according to the object such as a face. The area of comparison may be a portion of the first image and the second image having an area N times larger than the area of the face and having a same center as the face. But, the area of comparison may not include unnecessary data such as data from another object in the first image and the second image. The area of comparison may be used to limit the area to be processed during the identification of the region of the object. In doing so, the area to be processed for identifying the region of the object is reduced. Thus, the process for generating a preferred image is further simplified. The area of comparison on the first image may be in the same position with the area of comparison on the second image. But, the area of comparison of the first image may or may not be the same area as the area of comparison of the second image.

It should be noted that the above mentioned examples are not meant to limit the scope of the invention. The examples are merely used to further describe the embodiments of the present invention. The present invention has presented embodiments of methods for generating a preferred image by replacing a region of a base image with a region of an image. Thereby, allowing the user to have a perfect shot generated from a plurality of flawed images. And since the base image and the another image are compared to generate the region, the generated preferred image would not display any flaw due to the replacement of the region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a preferred image, comprising:
   capturing, by an image capturing device, at least two images;
   displaying the at least two images on a user interface of the image capturing device;
   selecting one of the at least two images as a base image;
   selecting an object on the base image;
   a processor of the image capturing device identifying a region of the object on the base image and a region of the object on another image of the at least two images by comparing an area around the object on the base image and an area around the object on the another image to find similarity around the object on the base image and the object on the another image; and
   the processor of the image capturing device replacing the region on the base image with the region on the another image using a Laplacian pyramid to generate the preferred image.

2. The method of claim 1, further comprising:
   matching features of the at least two images.

3. The method of claim 1, wherein the region of the object on the base image is larger than the object on the base image and includes the object on the base image and an area around the object on the base image.

4. The method of claim 1 further comprising:
   automatically identifying the region of the object on the base image and the region of the object on the another image to have a same size.

5. The method of claim 4 further comprising:
   identifying an outline of the region by matching data around the object on the base image and the object on the another image.

6. The method of claim 5, wherein the outline of the region is automatically selected.

7. The method of claim 1, wherein the at least two images are sequentially captured images.

8. The method of claim 7, wherein the base image is a first image of the at least two images.

9. The method of claim 1, wherein the object corresponds to a face of a subject of the at least two images.

10. The method of claim 1, wherein a user interface is used for previewing and selecting the face of the subject from the at least two images other than the base image.

11. The method of claim 1, further comprising:
    determining an area of comparison on the base image and the another image according to the object;
    wherein the area of comparison includes the region of the object.

12. A method for generating a preferred image, comprising:
    an image capturing device sequentially capturing at least two images;
    displaying the at least two images on a user interface of the image capturing device;
    selecting an object on a first image of the at least two images;
    a processor of the image capturing device identifying a region on the first image where the region on the first image includes the object on the first image and an area around the object on the first image;
    the processor of the image capturing device identifying a region on a second image of the at least two images where the region on the second image includes the object on the second image and an area around the object on the second image;
    the processor of the image capturing device adjusting sizes of the region on the first image and the region on the second image until differences in image data between the area around the object on the first image and the area around the object on the second image are below a predetermined threshold; and
    the processor of the image capturing device replacing the region on the second image with the region on the first image using a Laplacian pyramid to generate the preferred image.

13. The method of claim 12 further comprising:
    identifying the region on the first image and the region the second image to have a same size.

14. The method of claim 12, wherein the object corresponds to a face of a subject of the plurality of sequentially captured images.

15. The method of claim 14, wherein a user interface is used for previewing and selecting the face of the subject from the at least two images corresponding to the object.

16. A method for generating a preferred image, comprising:
    an image capturing device sequentially capturing at least two images;
    selecting an object on a first image of the at least two images;
    a processor of the image capturing device identifying a region on the first image where the region of the first image includes the object on the first image and an area around the object on the first image;

the processor of the image capturing device identifying a region on a second image of the at least two images where the region of the second image includes the object on the second image and an area around the object on the second image;

the processor of the image capturing device adjusting sizes of the region on the first image and the region on the second image until differences in image data between the area around the object on the first image and the area around the object on the second image are below a predetermined threshold; and the processor of the image capturing device replacing the region on the first image with the region on the second image using a Laplacian pyramid to generate the preferred image.

17. The method of claim 16 further comprising:
identifying the region on the first image and the region the second image to have a same size.

18. The method of claim 16, wherein the object corresponds to a face of a subject of the plurality of sequentially captured images.

19. The method of claim 18, wherein a user interface is used for previewing and selecting the face of the subject from the at least two images corresponding to the object.

* * * * *